(12) United States Patent
Park et al.

(10) Patent No.: US 10,627,674 B2
(45) Date of Patent: Apr. 21, 2020

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Je-Beom Park, Paju-si (KR); Ji-Su Yoon, Paju-si (KR); Min-Jae Kang, Paju-si (KR); Kyu-Hwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/141,310

(22) Filed: Sep. 25, 2018

(65) Prior Publication Data

US 2019/0094617 A1  Mar. 28, 2019

(30) Foreign Application Priority Data

Sep. 28, 2017 (KR) .......................... 10-2017-0126433

(51) Int. Cl.
| | |
|---|---|
| *G02F 1/1335* | (2006.01) |
| *G02F 1/1333* | (2006.01) |
| *F21V 8/00* | (2006.01) |
| *G02B 6/42* | (2006.01) |
| *G02F 1/13357* | (2006.01) |
| *G09G 3/36* | (2006.01) |
| *G02F 1/1362* | (2006.01) |

(52) U.S. Cl.
CPC ..... *G02F 1/133603* (2013.01); *G02B 6/0025* (2013.01); *G02B 6/0055* (2013.01); *G02F 1/133308* (2013.01); *G02F 1/133514* (2013.01); *G02F 1/133528* (2013.01); *G02F 1/133605* (2013.01); *G02F 1/133615* (2013.01); *G02F 1/136286* (2013.01); *G09G 3/3607* (2013.01); *G02F 2001/133614* (2013.01)

(58) Field of Classification Search
None
See application file for complete search history.

(56) References Cited

U.S. PATENT DOCUMENTS

| | | | |
|---|---|---|---|
| 2012/0147296 A1* | 6/2012 | Montgomery .... | G02F 1/133615 349/70 |
| 2015/0103151 A1* | 4/2015 | Carls ................... | G02B 27/149 348/52 |
| 2015/0109814 A1* | 4/2015 | Chen .................... | G02B 6/0073 362/606 |

(Continued)

OTHER PUBLICATIONS

Extended European Search Report dated Jan. 25, 2019, issued in corresponding European Patent Application No. 18195432.2.

*Primary Examiner* — Edward J Glick
*Assistant Examiner* — Anthony G Quash
(74) *Attorney, Agent, or Firm* — Morgan, Lewis & Bockius LLP

(57) ABSTRACT

The present disclosure relates to a backlight unit and a liquid crystal display device. The liquid crystal display device includes a display panel including a red pixel, a green pixel, and a blue pixel; and a backlight unit which emits light to the display panel, wherein the backlight unit includes: a light source providing a first color light; a color conversion layer disposed on the light source and converting a part of the first color light into a second color light; an optical sheet between the display panel and the color conversion layer; and an air gap between the color conversion layer and the optical sheet.

18 Claims, 12 Drawing Sheets

(56) References Cited

U.S. PATENT DOCUMENTS

| | | | |
|---|---|---|---|
| 2015/0124188 A1* | 5/2015 | Kadowaki | G02F 1/133553 |
| | | | 349/42 |
| 2015/0260903 A1* | 9/2015 | Kashima | G02B 6/0056 |
| | | | 349/65 |
| 2015/0323728 A1 | 11/2015 | Lee et al. | |
| 2016/0043288 A1* | 2/2016 | Chen | H01L 33/504 |
| | | | 257/89 |
| 2016/0070137 A1* | 3/2016 | You | G02F 1/133609 |
| | | | 349/71 |
| 2016/0085109 A1 | 3/2016 | Baek et al. | |
| 2016/0201858 A1* | 7/2016 | Kang | G02B 6/005 |
| | | | 349/71 |
| 2016/0291231 A1* | 10/2016 | Jang | G02B 6/005 |
| 2016/0377786 A1 | 12/2016 | Ham | |
| 2017/0168351 A1 | 6/2017 | Qiu et al. | |

\* cited by examiner

| No. | Evaluation SPL Information | | | | Luminance [nit] | |
|---|---|---|---|---|---|---|
| | PNL | Spectrum Structure | Light Distribution | | | |
| Ref. | 140 / 372 / 350 | w/o Air | | | 5,030 | @80W and 55" |
| No. 1 | 140 / 372 / 350 | w/t Air | | | 6,663 (133%) | |

# BACKLIGHT UNIT AND LIQUID CRYSTAL DISPLAY DEVICE INCLUDING THE SAME

CROSS-REFERENCE TO RELATED APPLICATIONS

This application claims priority to and the benefit of Republic of Korea Patent Application No. 2017-0126433 filed in the Republic of Korea on Sep. 28, 2017, which is incorporated herein by reference in its entirety.

BACKGROUND

1. Technical Field

The present disclosure relates to a backlight unit and a liquid crystal display device including the same.

2. Discussion of the Related Art

As an information-oriented society has developed, a variety of needs with respect to a display device for displaying an image have increased. Accordingly, recently, several flat panel display devices such as a liquid crystal display (LCD) device, a plasma display panel (PDP), an organic electroluminescence display device have been utilized. Among flat panel display devices, an LCD device displays an image by modulating light which is incident from a backlight unit by controlling an electric field applied to a liquid crystal layer.

In such LCD devices, backlight units may be classified into a direct light type backlight unit and an edge light type backlight unit depending on an arrangement of light sources. In the direct light type backlight unit, a plurality of light sources are arranged on a rear surface of an LCD panel and light emitted by the light sources is transmitted toward the LCD panel. On the other hand, in the edge light type backlight unit, a plurality of light sources are arranged on one side of a bottom of an LCD panel and light emitted by the light sources is transmitted toward the LCD panel by using a light guide plate.

Meanwhile, in the light sources of the direct light type or edge light type backlight unit, white light in which blue light, red light, and green light are mixed, is emitted toward the rear surface of the LCD panel or a side of the light guide plate. Here, the green light is generated by absorbing, by a green fluorescent material, the blue light, and the red light is generated by absorbing, by a red fluorescent material, the blue light.

Referring to FIG. 1, it may be seen that a part of a green light emitting area overlaps a red color absorption area. Due to such properties, since the red fluorescent material absorbs the green light as much as an area "R" in which the green light emitting area overlaps the red color absorption area, the green light is reduced. Accordingly, luminance of light is reduced.

SUMMARY

Accordingly, embodiments of the present disclosure are directed to a backlight unit and a liquid crystal display device that substantially obviate one or more of the problems due to limitations and disadvantages of the related art.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a liquid crystal display device comprises a display panel including a red pixel, a green pixel, and a blue pixel; and a backlight unit which emits light to the display panel, wherein the backlight unit includes: a light source providing a first color light; a color conversion layer disposed on the light source and converting a part of the first color light into a second color light; an optical sheet between the display panel and the color conversion layer; and an air gap between the color conversion layer and the optical sheet.

In another aspect, a backlight unit comprises a light source providing a first color light; an optical sheet on the light source; a color conversion layer between the light source and the optical sheet and converting a part of the first color light into a second color light; and an air gap between the color conversion layer and the optical sheet, wherein the first color light includes blue light, and the second color light includes green light.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles.

DETAILED DESCRIPTION

Figure 1:
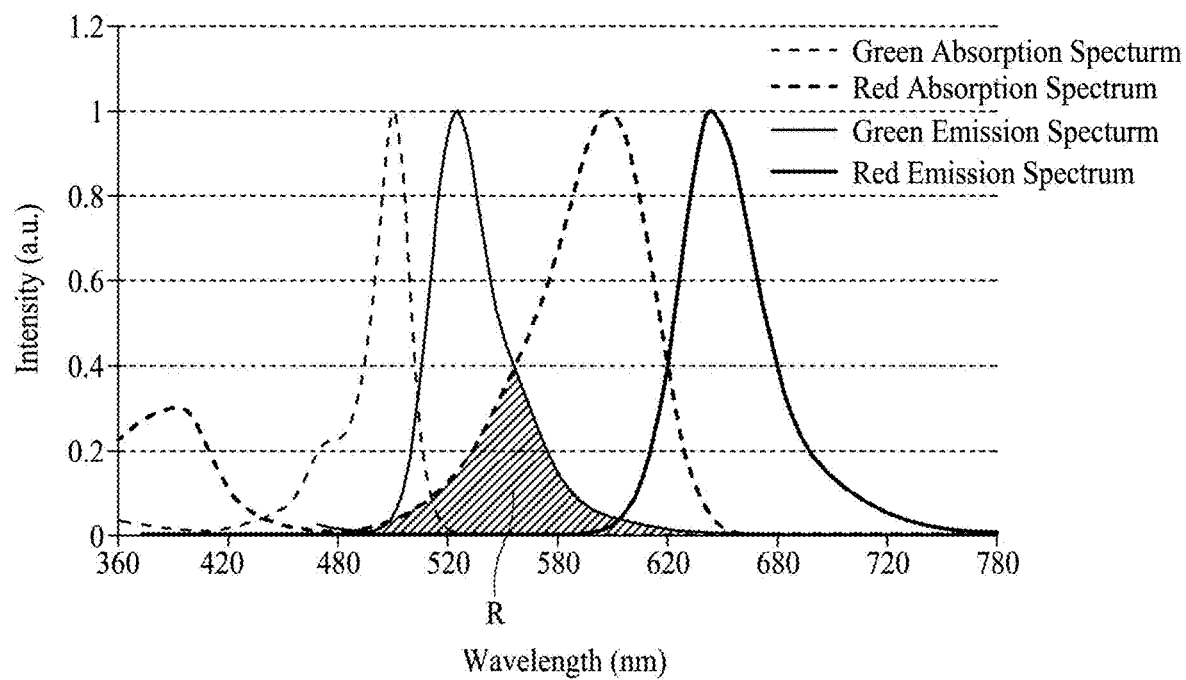
FIG. 1 is a graph illustrating absorption spectrums and emission spectrums with respect to red and green.

Reference will now be made in detail to embodiments of the invention, examples of which are illustrated in the accompanying drawings.

Advantages and features of the present disclosure and a method of achieving the same will become apparent with reference to the attached drawings and embodiments described below in detail. However, the present disclosure is not limited to the embodiments described below and may be embodied with a variety of different modifications. The embodiments are merely provided to allow one of ordinary skill in the art to completely understand the scope of the present disclosure, and the present disclosure is defined by only the scope of the claims.

Shapes, sizes, ratios, angles, numbers, and the like shown in the drawings to explain the embodiments of the present disclosure are merely examples, and the present disclosure is not limited to the shown in the drawings. Throughout the specification, like reference numerals refer to like elements. In the description of the embodiments of the present disclosure, a detailed description of a well-known technology of the related art will be omitted when it is deemed to obscure the essence of the present disclosure.

When "comprise," "have," "include," and the like are stated herein, another parts may be added unless "only" is used. Singular expressions of components, unless particularly defined otherwise, include plural expressions thereof.

When a component is interpreted, an error range is included without an additional explicit statement thereof.

In a description on a position relationship, when a position relationship between two parts is described as, for example, "on," "above," "below," "beside," and the like, one or more other parts may be located between the two parts unless "just" or "directly" is used.

In a description on a time relationship, when a temporal order relationship is described as, for example, "after," "next to," "and then," "before," and the like, discontinuous cases may also be included unless "just" or "directly" is used.

Terms such as first, second, and the like are used for describing a variety of components. However, the components will not be limited by the terms. The terms are used merely for distinguishing one component from others. Accordingly, a first component stated below may be a second component within the technical concept of the present disclosure.

The term "at least one" should be understood as including all combinations of one or more related items. For example, "at least one of a first item, a second item, and a third item" may mean not only each of the first item, the second item, and the third item but also any combinations of all items from two or more of the first item, the second item, and the third item.

Features of a variety of embodiments of the present disclosure may be partially or entirely combined or mixed with one another and may perform technically diverse interconnection and drive, and the embodiments may be independently performed from one another or may be performed together in a correlation.

Hereinafter, exemplary embodiments of the present disclosure will be described in detail with reference to the attached drawings.

Figure 2:
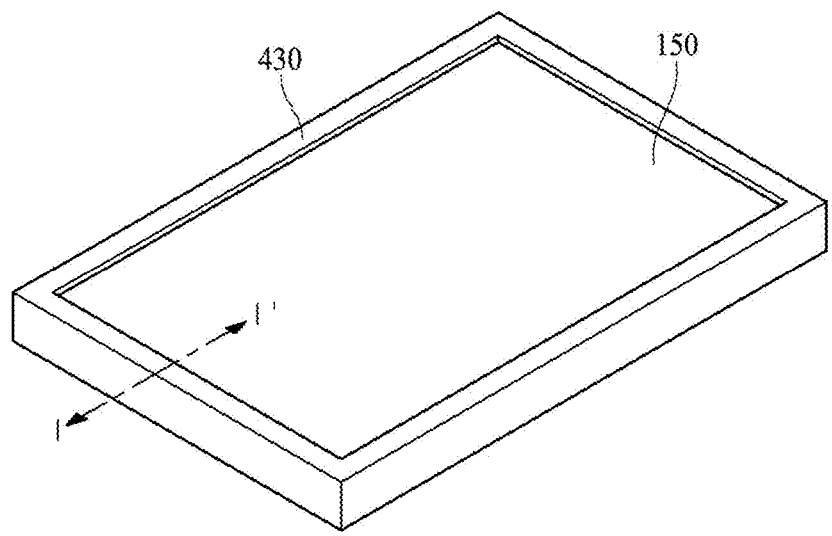
FIG. 2 is a perspective view of a liquid crystal display device according to one embodiment of the present disclosure.
Figure 3:
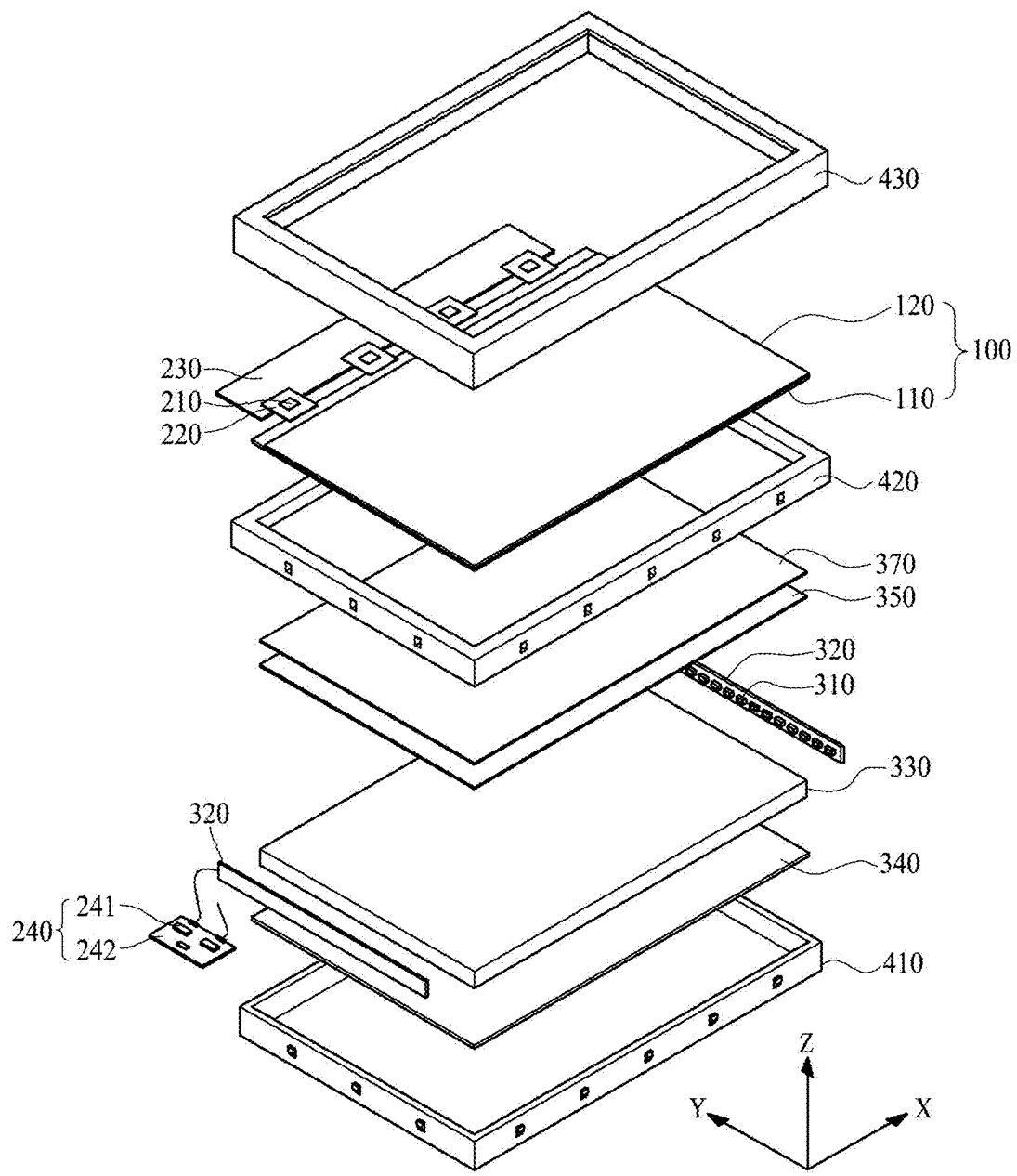
FIG. 3 is an exploded perspective view of the liquid crystal display device of FIG. 2.
Figure 4:
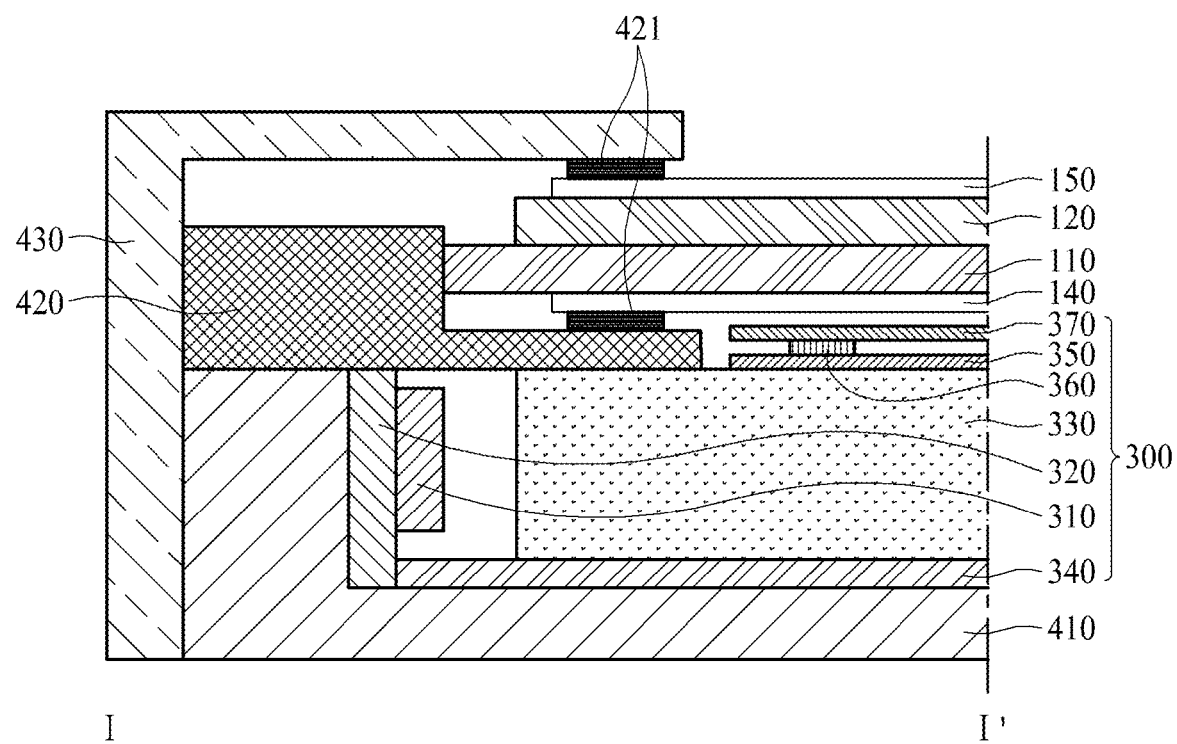
FIG. 4 is a cross-sectional view taken along I-I' in FIG. 2.

FIG. 2 is a perspective view of a liquid crystal display device according to one embodiment of the present disclosure. FIG. 3 is an exploded perspective view of the liquid crystal display device of FIG. 2. FIG. 4 is a cross-sectional view taken along I-I' in FIG. 2.

Referring to FIGS. 2 to 4, the liquid crystal display device according to one embodiment of the present disclosure includes a display panel 100, a drive circuit portion for driving the display panel 100, a backlight unit 300, and a case member.

The display panel 100 includes a lower substrate 110, an upper substrate 120, and a liquid crystal layer interposed between the lower substrate 110 and the upper substrate 120. The lower substrate 110 and the upper substrate 120 may be formed of glass or plastic.

The lower substrate 110 may have a size larger than a size of the upper substrate 120.

Accordingly, flexible source films 220 may be attached to an edge of one side of a top surface of the lower substrate 110 which is not covered by the upper substrate 120. The top surface of the lower substrate 110 corresponds to a surface which faces the upper substrate 120.

Signal lines and pixels are provided on the top surface of the lower substrate 110 of the display panel 100. The signal lines may include data lines and gate lines which intersect one another, a common line for supplying a common voltage to common electrodes, and gate control signal lines supplying control signals to a gate drive circuit. Pixels may be arranged in an intersection area between the data lines and the gate lines. Each of the pixels includes a thin film transistor (TFT), a pixel electrode, and the common electrode. The TFT supplies a data voltage of the data line to the pixel electrode in response to a gate signal of the gate line.

Liquid crystals of the liquid crystal layer are driven by an electric field generated by a potential difference between the data voltage supplied to the pixel electrode and the common voltage supplied to the common electrode such that a transmission amount of light incident from the backlight unit may be adjusted.

A black matrix and a color filter may be provided on a bottom surface of the upper substrate 120 of the display panel 100. The bottom surface of the upper substrate 120 corresponds to a surface which faces the lower substrate 110. However, when the display panel 100 is formed using a color filter on TFT array (COT), the black matrix and the color filter may be provided on the top surface of the lower substrate 110.

The common electrode may be provided on the bottom surface of the upper substrate 120 in a perpendicular electric field drive method, such as a twisted nematic (TN) mode and a vertical alignment (VA) mode, or may be provided on the top surface of the lower substrate 110 in a horizontal electric field drive method, such as an in plane switching (IPS) mode and a fringe field switching (FFS) mode.

The black matrix includes a light-barrier material formed in a matrix structure so as to prevent light from leaking into areas except a pixel area.

The color filter is formed in the pixel area between the black matrixes. The color filter includes a red color filter, a green color filter, and a blue color filter.

An upper polarizing plate 150 is attached to the upper substrate 120 of the display panel 100, and a lower polarizing plate 140 is attached to the lower substrate 110. A light transmission axis of the upper polarizing plate 150 intersects with or vertically crosses a light transmission axis of the lower polarizing plate 140. Also, an alignment film for setting a pretilt angle of liquid crystals may be formed on inner sides of the upper substrate 120 and the lower substrate 110 which are in contact with the liquid crystals.

The drive circuit portion includes the gate drive circuit, source drive circuits 210, the flexible source films 220, a circuit board 230, and a light source drive portion 240.

The gate drive circuit supplies the gate signals to the gate lines of the lower substrate 110. The gate drive circuit may be formed directly on the top surface of the lower substrate 110 by using a gate driver in panel (GIP) method. Otherwise, when the gate drive circuit is embodied as a drive chip, the gate driving circuit may be mounted on a flexible gate film by using a chip on film (COF) method, and the flexible gate films may be attached to the edge of the top surface of the lower substrate 110 which is not covered by the upper substrate 120.

The source drive circuits 210 supply the data voltages to the data lines of the lower substrate 110. When each of the source drive circuits 210 is embodied as a drive chip, each of the source drive circuits 210 may be mounted on the flexible source film 220 by using a COF method. Otherwise, the source drive circuits 210 may be adhered to the top surface of the lower substrate 110 by using a chip on glass (COG) method or a chip on plastic (COP) method. The flexible source films 220 may be attached to the edge of the one side of the top surface of the lower substrate 110 and the circuit board 230 which are not covered by the upper substrate 120. The circuit board 230 may be embodied as a printed circuit board (PCB).

The light source drive portion 240 includes a light source drive circuit 241 and a light source circuit board 242.

The light source drive circuit 241 supplies drive currents to light sources 310 to allow the light sources 310 to emit light. The light source drive circuit 241 may be mounted on the light source circuit board 242. Otherwise, the light source drive circuit 241 may be mounted on the circuit board 230. In this case, the light source circuit board 242 may be omitted.

The drive circuit portion may further include a timing control circuit and a control circuit board on which the timing control circuit is mounted. In this case, the control circuit board may be connected to the circuit board 230 through a certain flexible cable.

The backlight unit 300 includes a plurality of such light sources 310, a light source circuit board 320, a light guide plate 330, a reflection sheet 340, an optical sheet 370, and the like. The backlight unit 300 converts light from the light sources 310 into a uniform surface light source through the light guide plate 330 and the optical sheet 370 and emits light toward the display panel 100. Although the backlight unit is described with reference to FIGS. 3 and 4 as being embodied as an edge light type, it is necessary to note that the backlight unit is not limited thereto and may be embodied as a direct light type.

The light sources 310 may be embodied as light emitting diodes (LEDs). Here, the LEDs may include at least one of a blue LED which outputs blue light, a red LED which outputs red light, and a magenta LED which outputs magenta light, in which blue light and red light are mixed.

The light sources 310 are arranged on at least one side surface of the light guide plate 330 and emit light toward the side surface of the light guide plate 330. The light sources 310 are mounted on the light source circuit board 320 and turned on or off by receiving drive currents of the light source drive circuit 241. The light source circuit board 320 is connected to the light source drive portion 240.

The light guide plate 330 converts light from the light sources 310 into a surface light source and emits light toward the display panel 100. The reflection sheet 340 is disposed on a bottom surface of the light guide plate 330 and reflects light, which moves from the light guide plate 330 toward the bottom of the light guide plate 330, toward the light guide plate 330.

An optical sheet 370 is disposed between the light guide plate 330 and the display panel 100. That is, the optical sheet 370 is disposed below the display panel 100, and the light guide plate 330 is disposed below the optical sheet 370. The optical sheet 370 includes one or more prism sheets or one or more diffusion sheets, diffuses light incident from the light guide plate 330, and refracts a progression path of light to allow the light to be incident on a light-incident surface of the display panel 100 at a substantially vertical angle. Also, the optical sheet 370 may include a dual brightness enhancement film (DBEF). For example, the optical sheet 370 may include a diffusion sheet, a prism sheet, and a DBEF. In this case, an uppermost optical sheet of the optical sheet 370 may be a DBEF.

A color conversion layer 350 is disposed on the light guide plate 330 and converts blue light or magenta light incident from the light sources 310 through the light guide plate 330 into white light. Particularly, the color conversion layer 350 according to the embodiment may include a green color conversion layer which converts blue light or magenta light into green light.

An adhesive layer (or adhesion pattern) 360 is disposed between the color conversion layer 350 and the optical sheet 370. The adhesive layer 360 allows the color conversion layer 350 and the optical sheet 370 to adhere to each other and forms an air gap between the color conversion layer 350 and the optical sheet 370. A detailed description of the color conversion layer 350 and the adhesive layer 360 will be described below with reference to FIGS. 5 to 11.

The case member includes a bottom cover 410, a support frame 420, and a top case 430.

The bottom cover 410 is manufactured as a square metal frame and surrounds a side surface and a bottom surface of the backlight unit 300 as shown in FIG. 4. The bottom cover 410 may be manufactured using a high strength steel plate, for example, an electro galvanized iron (EGI) plate, a steel use stainless (SUS) plate, a galvarium (SGLC) steel sheet, an aluminum-plated steel sheet (ALCOSTA), a tin-plated steel sheet (SPTE), and the like.

The support frame 420 supports a bottom surface of the lower substrate 110 of the display panel 100. The support frame 420 is also referred to as a guide panel, a guide frame, or the like. The support frame 420 may be fixedly combined with the bottom cover 410 by using a fixing member. The support frame 420 may be manufactured as a square frame formed of glass fibers mixed in a synthetic resin such as polycarbonate and the like, or may be manufactured using an SUS plate. Meanwhile, a buffering member 421 may be provided between the lower substrate 110 and the support frame 420 as shown in FIG. 4 to protect the lower substrate 110 of the display panel 100 from being shocked by the support frame 420.

The top case 430 surrounds edges of the display panel 100, a top surface and a side surface of the guide frame 420, and side surfaces of the bottom cover 410. The top case 430 may be manufactured using an EGI plate, an SUS plate, or the like. The top case 430 may be fixed to the support frame 420 by using a hook or a screw. Meanwhile, the buffering member 421 may be provided between the upper substrate 120 and the top case 430 as shown in FIG. 4 to protect the upper substrate 120 of the display panel 100 from being shocked by the top case 430.

First Embodiment

Figure 5:
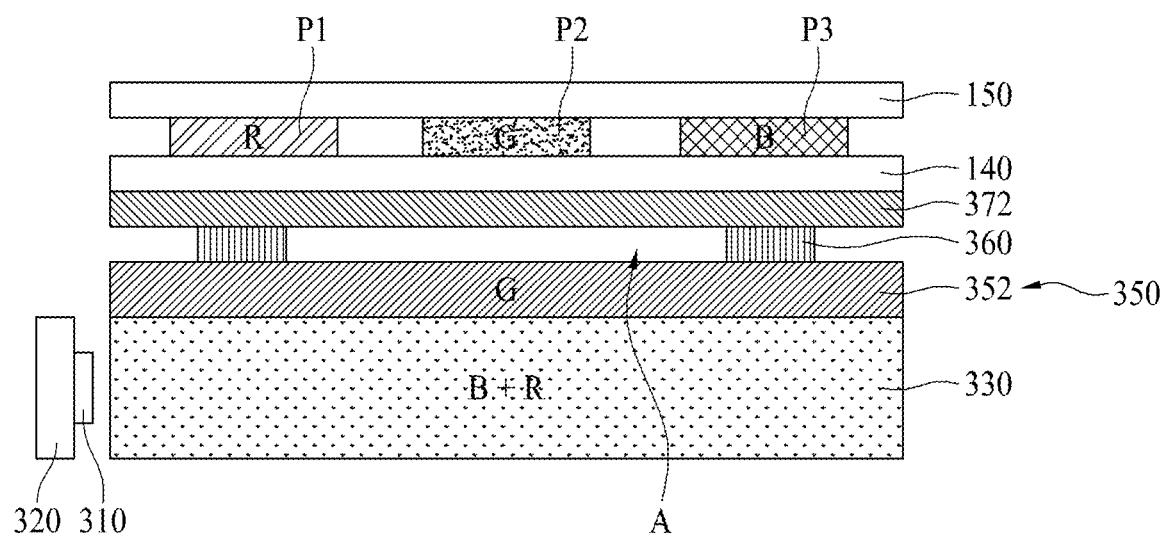
FIG. 5 is a schematic cross-sectional view illustrating a first embodiment of a color conversion layer and an adhesive layer.

FIG. 5 is a schematic cross-sectional view illustrating a first embodiment of the color conversion layer and the adhesive layer.

Referring to FIG. 5, a liquid crystal display device includes the display panel 100 and the backlight unit 300.

First, the backlight unit 300 includes the light sources 310, the light guide plate 330, a green color conversion layer 352, the adhesive layer 360, and a prism sheet 372.

The light sources 310 may include a blue LED which emits blue light and a red LED which emits red light or may include a magenta LED which emits magenta light, in which blue light and red light are mixed. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the first embodiment of the present disclosure, on the light guide plate 330, blue light may be incident from the blue LED, and red light may be incident from the red LED. Here, the blue light and the red light may be mixed in the light guide plate 330 to become the magenta light. Meanwhile, on the light guide plate 330, magenta light may be incident from the magenta LED.

Accordingly, the light guide plate 330 allows the magenta light to proceed toward the display panel 100. The green color conversion layer 352 is formed on the light guide plate 330 to overlap a plurality of pixels P1, P2, and P3. The green color conversion layer 352 is disposed on a path of light which proceeds toward the display panel 100 from the light guide plate 330 and converts the magenta light emitted by the light guide plate 330 into white light. In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and light which has passed through the green color conversion layer 352 is mixed with blue light, red light, and green light and converted into white light.

The above-described green light emitting material includes a green phosphorescent material or a green fluorescent material and is mixed with a transparent resin material, such as a silicone resin, to form the green color conversion layer 352. The prism sheet 372 condenses light, which is incident thereon, toward the lower polarizing plate 140.

The adhesive layer 360 is disposed between the green color conversion layer 352 and the prism sheet 372. The adhesive layer 360 is formed on only a part of a top surface of the green color conversion layer 352 so as to allow the prism sheet 372 to adhere to the green color conversion layer 352 simultaneously while forming an air gap A between the green color conversion layer 352 and the prism sheet 372. Here, it is necessary to form the adhesive layer 360 so as to not overlap a green (G) pixel P2 such that green light generated by the green color conversion layer 352 proceeds toward the G pixel P2 without luminance reduction. That is, the adhesive layer 360 is formed to overlap a red (R) pixel P1 and a blue (B) pixel P3 as shown in FIG. 5. The adhesive layer 360 has an area (a combined area) being smaller than the green color conversion layer 352 (i.e., color conversion layer) and/or the prism sheet 372 (i.e., optical sheet). The air gap A is formed between adjacent adhesive layers 360.

Next, the display panel 100 includes the lower polarizing plate 140, the upper polarizing plate 150, and a plurality of such pixels P1, P2, and P3.

The lower polarizing plate 140 is disposed at the bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

The red color filter includes red color which transmits light having a red wavelength and absorbs light having other wavelengths. The green color filter includes green color which transmits light having a green wavelength and absorbs light having other wavelengths. The blue color filter includes blue color which transmits light having a blue wavelength and absorbs light having other wavelengths.

Accordingly, in the R pixel P1, as the white light generated by the green color conversion layer 352 passes through the red color filter, blue light and green light are absorbed and only red light is emitted. In the G pixel P2, as the white light generated by the green color conversion layer 352 passes through the green color filter, blue light and red light are absorbed and only green light is emitted. In the B pixel P3, as the white light generated by the green color conversion layer 352 passes through the blue color filter, red light and green light are absorbed and only blue light is emitted.

Figure 12:
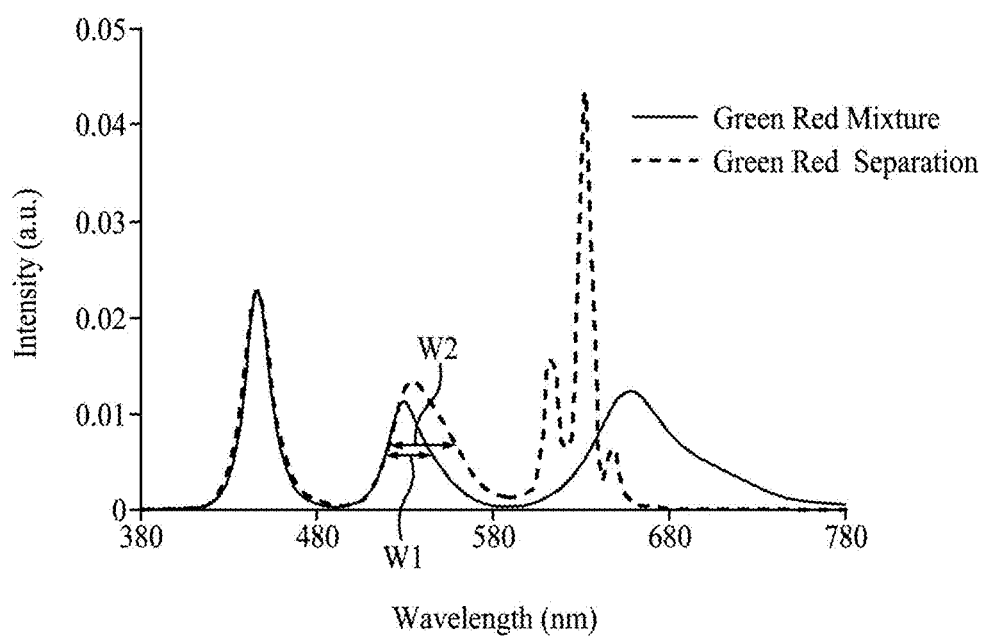
FIG. 12 is a graph illustrating an increase in luminance of a configuration in which red light and green light are spatially separated.

In the liquid crystal display device according to the first embodiment of the present disclosure, only blue light and red light are emitted by the light sources 310 and green light is generated by the green color conversion layer 352. That is, since red light and green light are spatially separated and the red light is generated first followed by generation of the green light, the liquid crystal apparatus prevents a red light emitting material from absorbing the green light. Accordingly, in the liquid crystal display device according to the first embodiment of the present disclosure, the green light increases and a half width of a green peak increases, as shown in FIG. 12, such that brightness of light may be expected to increase.

Also, the liquid crystal display device according to the first embodiment of the present disclosure may prevent a light-condensing function of the prism sheet 372 from being deteriorated by a scattering property caused by the green light emitting material of the green color conversion layer 352 by forming the air gap A between the green color conversion layer 352 and the prism sheet 372. This structure will be described below in detail with reference to FIGS. 13A to 15.

Meanwhile, although it is assumed in FIG. 5 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a green color conversion layer.

Second Embodiment

Figure 6:
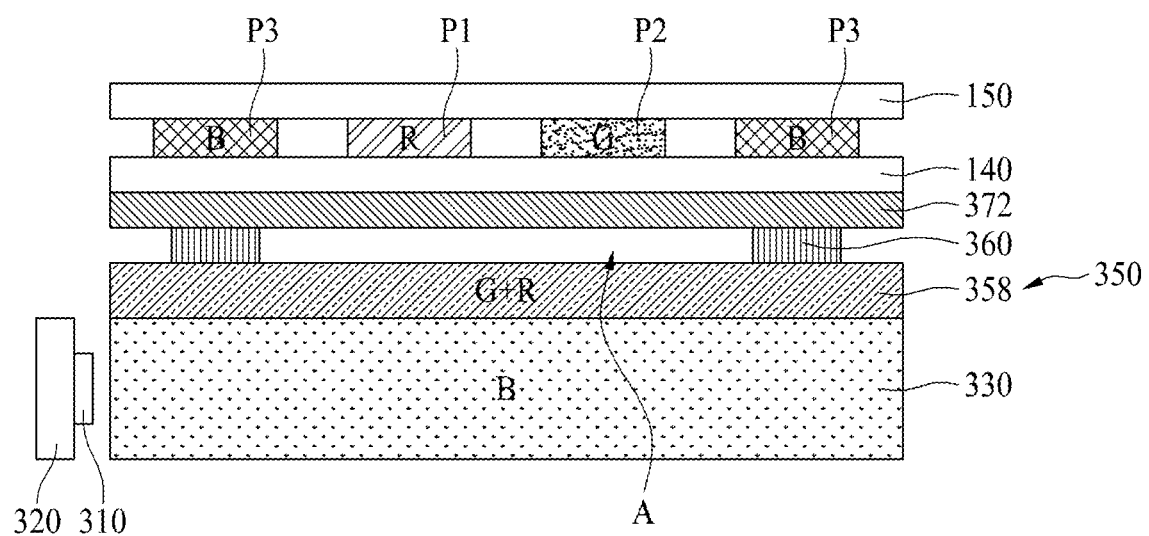
FIG. 6 is a schematic cross-sectional view illustrating a second embodiment of the color conversion layer and the adhesive layer.

FIG. 6 is a schematic cross-sectional view illustrating a second embodiment of the color conversion layer and the adhesive layer.

Referring to FIG. 6, a liquid crystal display device includes the display panel 100 and the backlight unit 300.

First, the backlight unit 300 includes the light sources 310, the light guide plate 330, a mixture conversion layer 358, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the second embodiment of the present disclosure, on the light guide plate 330, blue light may be incident from the blue LED. Accordingly, the light guide plate 330 allows the blue light to proceed toward the display panel 100.

The mixture conversion layer 358 is formed on the light guide plate 330 to overlap a plurality of pixels P1, P2, and P3. The mixture conversion layer 358 is disposed on a path of light which proceeds toward the display panel 100 from the light guide plate 330 and converts the blue light emitted by the light guide plate 330 into white light. In more detail, the mixture conversion layer 358 includes a red light emitting material and a green light emitting material. The red light emitting material included in the mixture conversion layer 358 collides with a part of the blue light and absorbs energy of the blue light. Accordingly, a wavelength of the part of the blue light is changed into that of the red light. Also, the green light emitting material included in the mixture conversion layer 358 collides with a part of the blue light and absorbs energy of the blue light. Accordingly, a wavelength of the part of the blue light is changed into that of the green light. When the light passing through the mixture conversion layer 358 is mixed, the blue light, the red light, and the green light are mixed and converted into white light.

The above-described red light emitting material includes a red phosphorescent material or a red fluorescent material and is mixed with a transparent resin material, such as a silicone resin, to form the mixture conversion layer 358. The above-described green light emitting material includes a green phosphorescent material or a green fluorescent material and is mixed with a transparent resin material, such as a silicone resin, to form the mixture conversion layer 358. The prism sheet 372 condenses white light which is incident in a first direction. Here, the first direction may correspond to a major axis direction or a minor axis direction of the light guide plate 330.

The adhesive layer 360 is disposed between the mixture conversion layer 358 and the prism sheet 372. The adhesive layer 360 is formed on only a part of a top surface of the mixture conversion layer 358 so as to allow the prism sheet 372 to adhere to the mixture conversion layer 358 simultaneously while forming an air gap A between the mixture conversion layer 358 and the prism sheet 372.

Here, it is necessary to form the adhesive layer 360 to not overlap a red pixel P1 and a green pixel P2 such that the red light and the green light generated by the mixture conversion layer 358 may proceed to the red pixel P1 and the green pixel P2 without luminance reduction.

That is, the adhesive layer 360 is formed to overlap the B pixel P3 as shown in FIG. 6.

Next, the display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the white light generated by the mixture conversion layer 358 passes through the red color filter, blue light and green light are absorbed and only red light is emitted. In the G pixel P2, as the white light generated by the mixture conversion layer 358 passes through the green color filter, blue light and red light are absorbed and only green light is emitted. In the B pixel P3, as the white light generated by the mixture conversion layer 358 passes through the blue color filter, red light and green light are absorbed and only blue light is emitted.

The liquid crystal display device according to the second embodiment of the present disclosure may prevent a light-condensing function of the prism sheet 372 from being deteriorated by a scattering property caused by the red light emitting material and the green light emitting material of the mixture conversion layer 358 by forming the air gap A between the mixture conversion layer 358 and the prism sheet 372.

Meanwhile, although it is assumed in FIG. 6 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a mixture conversion layer.

Third Embodiment

Figure 7:
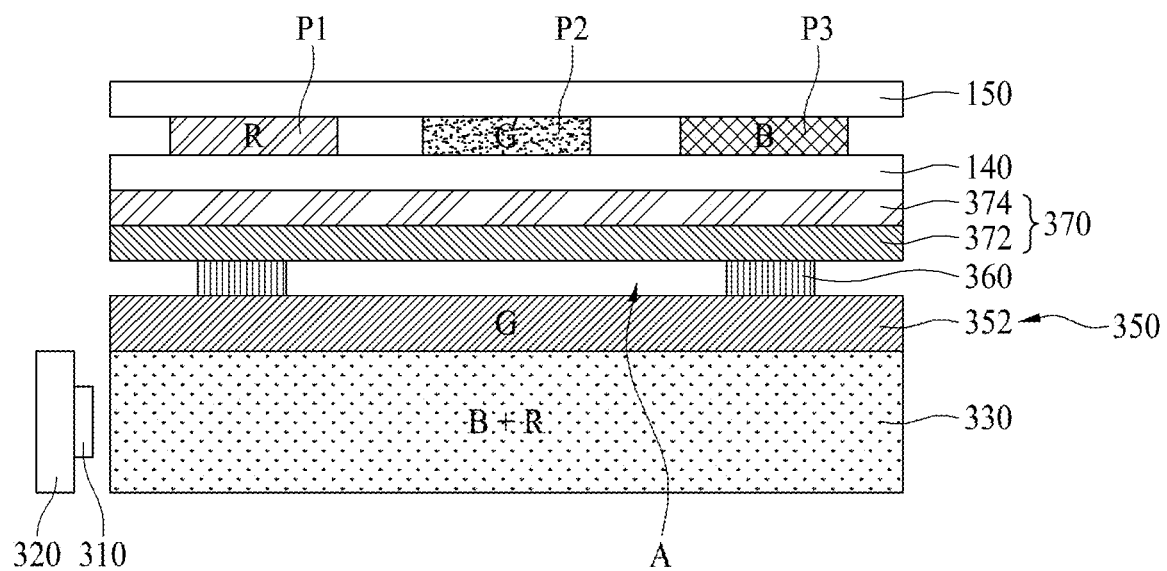
FIG. 7 is a schematic cross-sectional view illustrating a third embodiment of the color conversion layer and the adhesive layer.

FIG. 7 is a schematic cross-sectional view illustrating a third embodiment of the color conversion layer and the adhesive layer. In FIG. 7, the liquid crystal display device shown in FIG. 5 may further include a diffusion sheet 374. The diffusion sheet 374 is disposed on the prism sheet 372 and diffuses light which is incident thereon.

Since other components are equal to those of FIG. 5, a description thereof will be omitted.

Fourth Embodiment

Figure 8:
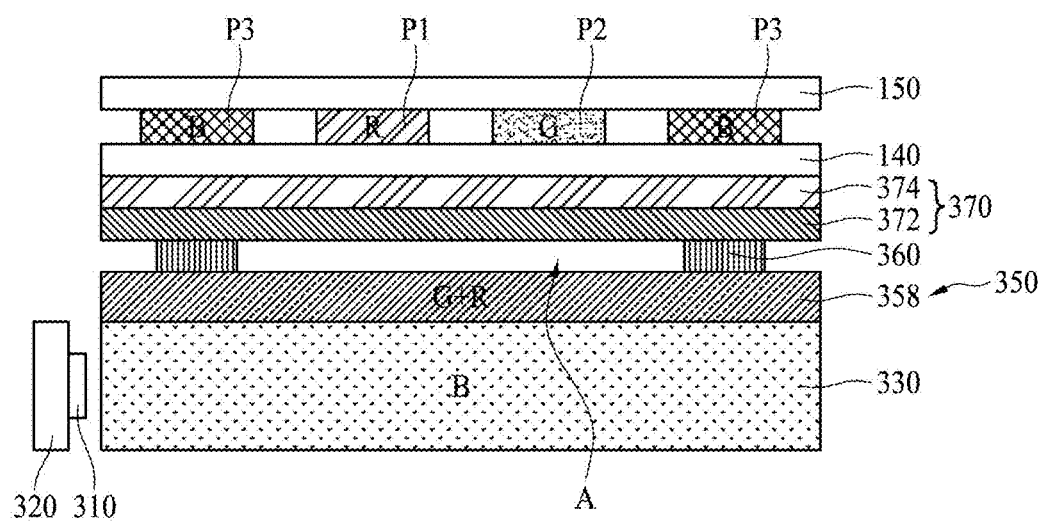
FIG. 8 is a schematic cross-sectional view illustrating a fourth embodiment of the color conversion layer and the adhesive layer.

FIG. 8 is a schematic cross-sectional view illustrating a fourth embodiment of the color conversion layer and the adhesive layer. In FIG. 8, the liquid crystal display device shown in FIG. 6 may further include the diffusion sheet 374. The diffusion sheet 374 is disposed on the prism sheet 372 and diffuses light which is incident thereon.

Since other components are equal to those of FIG. 6, a description thereof will be omitted.

Fifth Embodiment

Figure 9:
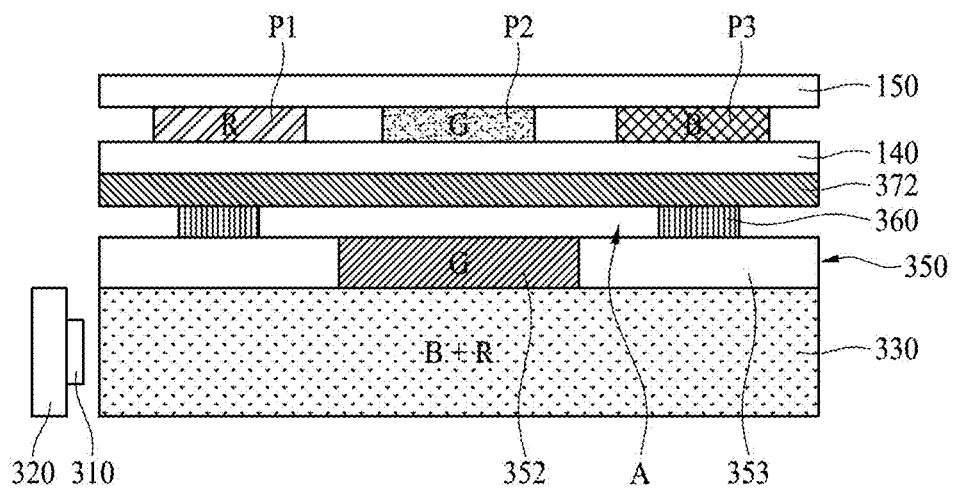
FIG. 9 is a schematic cross-sectional view illustrating a fifth embodiment of the color conversion layer and the adhesive layer.

FIG. 9 is a schematic cross-sectional view illustrating a fifth embodiment of the color conversion layer and the adhesive layer.

Referring to FIG. 9, a liquid crystal display device includes the display panel 100 and the backlight unit 300.

First, the backlight unit 300 includes the light sources 310, the light guide plate 330, the green color conversion layer 352, the adhesive layer 360, and the prism sheet 372.

The light sources 310 may include a blue LED which emits blue light and a red LED which emits red light or may include a magenta LED which emits magenta light, in which blue light and red light are mixed. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the fifth embodiment of the present disclosure, on the light guide plate 330, blue light may be incident from the blue LED, and red light may be incident from the red LED. Here, the blue light and the red light may be mixed in the light guide plate 330 to become the magenta light. Meanwhile, on the light guide plate 330, magenta light may be incident from the magenta LED. Accordingly, the light guide plate 330 allows the magenta light to proceed toward the display panel 100.

The green color conversion layer 352 is formed on the light guide plate 330 to overlap the G pixel P2, and a transparent layer 353 is formed on the light guide plate 330 to overlap the R pixel P1 and the B pixel P3. Namely, the color conversion layer 350 includes the green color conversion layer 352 and the transparent layer 353. The green color conversion layer 352 is disposed on a path of light which proceeds toward the display panel 100 from the light guide plate 330 and converts the magenta light emitted by the light guide plate 330 into white light. The green color conversion layer 352 may have an area being greater than the G pixel P2. In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and light which has passed through the green color conversion layer 352 is mixed with blue light, red light, and green light and converted into white light.

The above-described green light emitting material includes a green phosphorescent material or a green fluorescent material and is mixed with a transparent resin material, such as a silicone resin, to form the green color conversion layer 352. The prism sheet 372 condenses light, which is incident thereon, in a first direction. Here, the first direction may correspond to a major axis direction or a minor axis direction of the light guide plate 330.

The adhesive layer 360 is disposed between the color conversion layer 350 and the prism sheet 372. The adhesive layer 360 is formed on only a part of a top surface of the color conversion layer 350 so as to allow the prism sheet 372 to adhere to the green color conversion layer 352 simultaneously while forming an air gap A between the green color conversion layer 352 and the prism sheet 372. Here, it is necessary to form the adhesive layer 360 to not overlap a G pixel P2 such that green light generated by the green color conversion layer 352 proceeds toward the G pixel P2 without luminance reduction. That is, the adhesive layer 360 is formed to overlap an R pixel P1 and a B pixel P3 as shown in FIG. 9.

The adhesive layer 360 may have an area being smaller than each of the R pixel P1 and the blue pixel P3. The adhesive layer 360 is formed on the transparent layer 353. In other words, a bottom surface of the adhesive layer 360 contacts a top surface of the transparent layer 353. Alternatively, the bottom surface of the adhesive layer 360 may contact a top surface of the light guide plate 330 without the transparent layer 353. In this case, a thickness of the adhesive layer 360 is greater than that of the green color conversion layer 350 to form the air gap A.

Next, the display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, when the magenta light which is incident from the light guide plate 330 passes through the red color filter, the blue light is absorbed and only the red light is emitted. In the G pixel P2, as the white light generated by the green color conversion layer 352 passes through the green color filter, the blue light and red light are absorbed and only the green light is emitted. In the B pixel P3, when the magenta light which is incident from the light guide plate 330 passes through the blue color filter, the red light is absorbed and only the blue light is emitted.

Meanwhile, although it is assumed in FIG. 9 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a color conversion layer.

Sixth Embodiment

Figure 10:
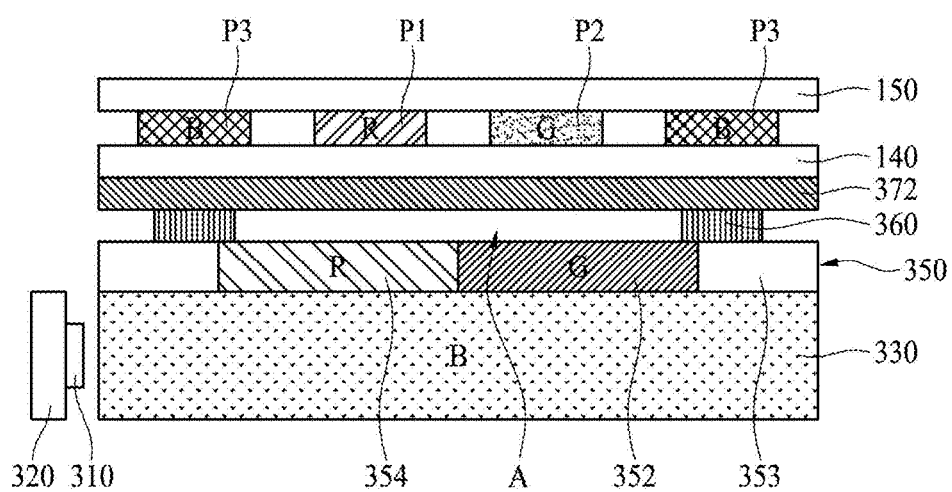
FIG. 10 is a schematic cross-sectional view illustrating a sixth embodiment of the color conversion layer and the adhesive layer.

FIG. 10 is a schematic cross-sectional view illustrating a sixth embodiment of the color conversion layer and the adhesive layer.

Referring to FIG. 10, a liquid crystal display device includes the display panel 100 and the backlight unit 300.

First, the backlight unit 300 includes the light sources 310, the light guide plate 330, the color conversion layer 350, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the sixth embodiment of the present disclosure, on the light guide plate 330, the blue light may be incident from the blue LED. Accordingly, the light guide plate 330 allows the blue light to proceed toward the display panel 100.

The color conversion layer 350 is disposed between the light guide plate 330 and the display panel 100 and includes a red color conversion layer 354 and the green color conversion layer 352. The color conversion layer 350 may further include a transparent layer 353.

The red color conversion layer 354 is formed on the light guide plate 330 to overlap an R pixel P1. The red color conversion layer 354 is disposed on a path of light which proceeds toward the display panel 100 from the light guide plate 330 and converts the blue light emitted by the light guide plate 330 into magenta light. The red color conversion layer 354 may have an area being greater than the R pixel P1. In more detail, the red color conversion layer 354 includes a red light emitting material. The red light emitting material included in the red color conversion layer 354 collides with a part of the blue light and absorbs energy of the blue light. Accordingly, a wavelength of the part of the blue light is changed into that of the red light, and light which has passed through the red color conversion layer 354 is mixed with the blue light, red light, and green light and converted into magenta light.

The above-described red light emitting material includes a red phosphorescent material or a red fluorescent material and is mixed with a transparent resin material, such as a silicone resin, to form the red color conversion layer 354.

The green color conversion layer 352 is formed on the light guide plate 330 to overlap the G pixel P2. The green color conversion layer 352 is disposed on a path of light which proceeds toward the display panel 100 from the light guide plate 330 and converts the blue light emitted by the light guide plate 330 into cyan light. The green color conversion layer 352 may have an area being greater than the G pixel P2. In more detail, the green color conversion layer 352 includes a green light emitting material. The green light emitting material included in the green color conversion layer 352 collides with a part of the blue light and absorbs energy of the blue light. Accordingly, a wavelength of the part of the blue light is changed into that of green light, and light which has passed through the green color conversion layer 352 is mixed with blue light and green light and converted into cyan light.

The above-described green light emitting material includes a green phosphorescent material or a green fluorescent material and is mixed with a transparent resin material, such as a silicone resin, to form the green color conversion layer 352.

The transparent layer 353 may correspond to the B pixel P3.

The prism sheet 372 condenses white light, which is incident thereon, in a first direction. Here, the first direction may correspond to a major axis direction or a minor axis direction of the light guide plate 330.

The adhesive layer 360 is disposed between the color conversion layer 350 and the prism sheet 372. The adhesive layer 360 is formed on only a part of a top surface of the color conversion layer 350 so as to allow the prism sheet 372 to adhere to the color conversion layer 350 simultaneously while forming an air gap A between the color conversion layer 350 and the prism sheet 372. Here, it is necessary to form the adhesive layer 360 to not overlap a G pixel P2 such that the green light generated by the green color conversion layer 352 proceeds toward the G pixel P2 without luminance reduction. Here, it is necessary to form the adhesive layer 360 to not overlap an R pixel P1 such that the red light generated by the red color conversion layer 354 proceeds toward the R pixel P1 without luminance reduction. That is, the adhesive layer 360 is formed to overlap a B pixel P3 as shown in FIG. 10.

The adhesive layer 360 may have an area being smaller than the blue pixel P3. The adhesive layer 360 is formed on the transparent layer 353. In other words, a bottom surface of the adhesive layer 360 contacts a top surface of the transparent layer 353. Alternatively, the bottom surface of the adhesive layer 360 may contact a top surface of the light guide plate 330 without the transparent layer 353. In this case, a thickness of the adhesive layer 360 is greater than that of the green color conversion layer 350 to form the air gap A.

Next, the display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, when the magenta light generated by the red color conversion layer 354 passes through the red color filter, blue light is absorbed and only red light is emitted. In the G pixel P2, when the cyan light generated by the green color conversion layer 352 passes through the green color filter, the blue light is absorbed and only the green light is emitted. In the B pixel P3, the blue light which is incident from the light guide plate 330 passes through the blue color filter as it is and is emitted.

In the liquid crystal display device according to the sixth embodiment of the present disclosure, the light sources 310 emit only blue light. Red light is generated by the red color conversion layer 354, and green light is generated by the green color conversion layer 352. That is, since red light and green light are spatially separated, the liquid crystal display device prevents the red light emitting material from absorbing the green light. Accordingly, in the liquid crystal display device according to the sixth embodiment of the present disclosure, the green light increases and a half width of a green peak increases, as shown in FIG. 12, such that brightness of light may be expected to increase.

Also, the liquid crystal display device according to the sixth embodiment of the present disclosure may prevent a light-condensing function of the prism sheet 372 from being deteriorated by a scattering property caused by the green light emitting material or the red light emitting material of the color conversion layer 350 by forming the air gap A between the color conversion layer 350 and the prism sheet 372.

Meanwhile, although it is assumed in FIG. 10 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a color conversion layer.

Seventh Embodiment

Figure 11:
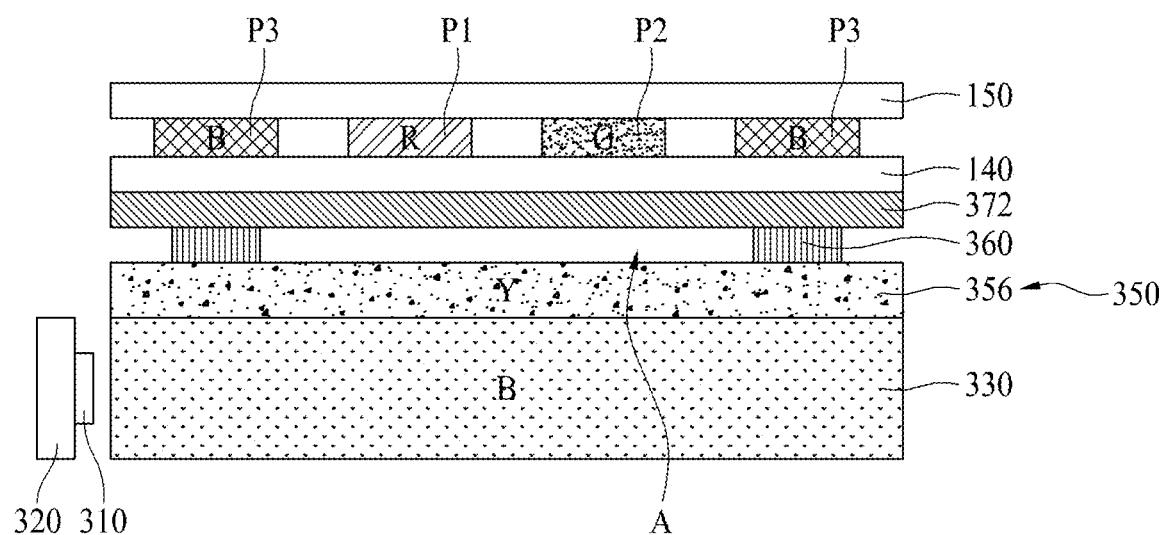
FIG. 11 is a schematic cross-sectional view illustrating a seventh embodiment of the color conversion layer and the adhesive layer.

FIG. 11 is a schematic cross-sectional view illustrating a seventh embodiment of the color conversion layer and the adhesive layer.

Referring to FIG. 11, a liquid crystal display device includes the display panel 100 and the backlight unit 300.

First, the backlight unit 300 includes the light sources 310, the light guide plate 330, a yellow color conversion layer 356, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the seventh embodiment of the present disclosure, on the light guide plate 330, the blue light may be incident from the blue LED. Accordingly, the light guide plate 330 allows the blue light to proceed toward the display panel 100.

The yellow color conversion layer 356 is formed on the light guide plate 330 to overlap a plurality of pixels P1, P2, and P3. The yellow color conversion layer 356 is disposed on a path of light which proceeds toward the display panel 100 from the light guide plate 330 and converts the blue light emitted by the light guide plate 330 into white light. In more detail, the yellow color conversion layer 356 includes a yellow light emitting material. The yellow light emitting material included in the yellow color conversion layer 356 collides with a part of the blue light and absorbs energy of the blue light. Accordingly, a wavelength of the part of the blue light is changed into that of yellow light, and light which has passed through the yellow color conversion layer 356 is mixed with the blue light and yellow light and converted into white light.

The above-described yellow light emitting material includes a yellow phosphorescent material or a yellow fluorescent material and is mixed with a transparent resin material, such as a silicone resin, to form the yellow color conversion layer 356.

The prism sheet 372 condenses the white light, which is incident thereon, in a first direction. Here, the first direction may correspond to a major axis direction or a minor axis direction of the light guide plate 330.

The adhesive layer 360 is disposed between the yellow color conversion layer 356 and the prism sheet 372. The adhesive layer 360 is formed on a part of a top surface of the yellow color conversion layer 356 so as to allow the prism sheet 372 to adhere to the yellow color conversion layer 356 simultaneously while forming an air gap A between the yellow color conversion layer 356 and the prism sheet 372. Here, it is necessary to form the adhesive layer 360 to not overlap a G pixel P2 and an R pixel P1 such that the yellow light generated by the yellow color conversion layer 356 proceeds toward the G pixel P2 and the R pixel P1 without luminance reduction. That is, the adhesive layer 360 is formed to overlap a B pixel P3 as shown in FIG. 11.

Next, the display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the white light generated by the yellow color conversion layer 356 passes through the red color filter, blue light and green light are absorbed and only red light is emitted. In the G pixel P2, as the white light generated by the yellow color conversion layer 356 passes through the green color filter, blue light and red light are absorbed and only green light is emitted. In the B pixel P3, as the white light generated by the yellow color conversion layer 356 passes through the blue color filter, red light and green light are absorbed and only blue light is emitted.

In the liquid crystal display device according to the seventh embodiment of the present disclosure, only blue light is emitted by the light sources 310, and yellow light is generated by the yellow color conversion layer 356. That is, the liquid crystal display device may prevent a red light emitting material from absorbing green light by generating yellow light using the yellow light emitting material. Accordingly, in the liquid crystal display device according to the seventh embodiment of the present disclosure, the green light increases and a half width of a green peak increases, as shown in FIG. 12, such that brightness of light may be expected to increase.

Also, the liquid crystal display device according to the seventh embodiment of the present disclosure may prevent a light-condensing function of the prism sheet 372 from being deteriorated by a scattering property caused by the yellow light emitting material of the yellow color conversion layer 356 by forming the air gap A between the yellow color conversion layer 356 and the prism sheet 372.

Meanwhile, although it is assumed in FIG. 11 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a yellow color conversion layer.

Figure 13A:
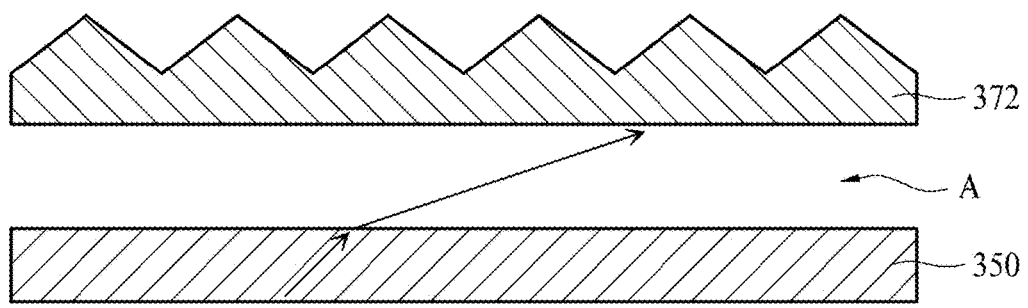
FIGS. 13A and 13B are views illustrating refraction of light depending on whether an air gap is present.
Figure 13B:
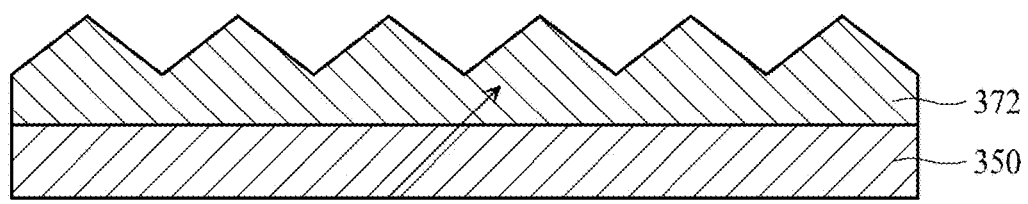
Figure 14A:
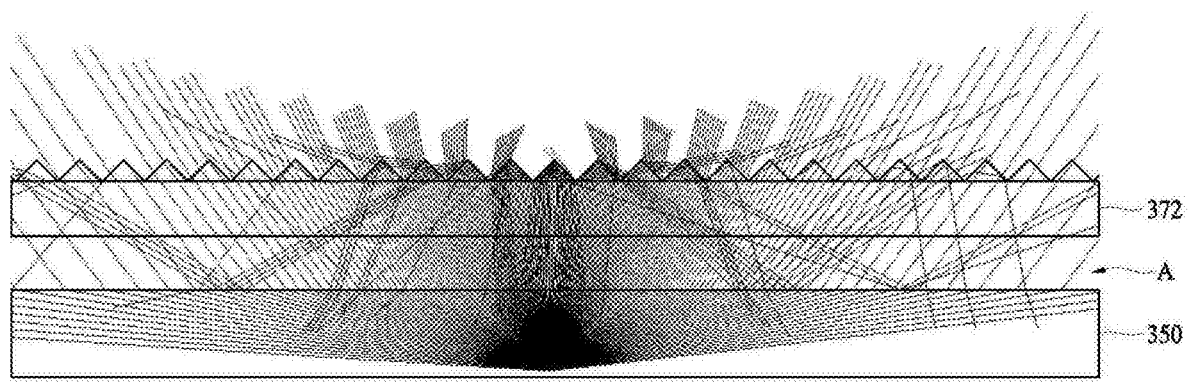
FIGS. 14A and 14B are views illustrating an optical path depending on whether an air gap is present.
Figures 14B, 15:
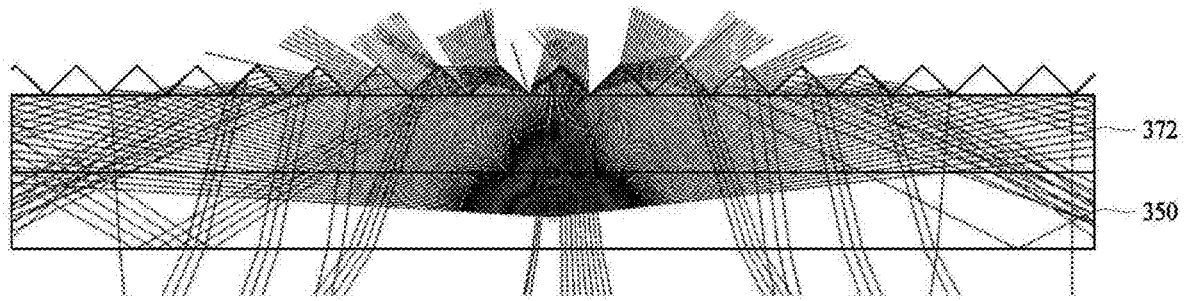
FIG. 15 is a view illustrating a difference in luminance depending on whether an air gap is present.

FIGS. 13A and 13B are views illustrating refraction of light depending on whether an air gap is present, and FIGS. 14A and 14B are views illustrating an optical path depending on whether an air gap is present.

FIG. 13A illustrates refraction of light when an air gap A is present between the color conversion layer 350 and the prism sheet 372. The light emitted by the color conversion layer 350 is refracted at a boundary between the color conversion layer 350 and the air gap according to Snell's law. Accordingly, light which is incident on the prism sheet 372 from the air gap A has less light with a beam spread angle of 90 degrees than that of in a case when the air gap A is not present.

FIG. 13B illustrates refraction of light when the air gap A is not present between the color conversion layer 350 and the prism sheet 372. Since the light emitted by the color conversion layer 350 is output by a light emitting material in a full range, more light is emitted with the light with the beam spread angle of 90 degrees than the case in which the air gap A is present.

Due to the above-described difference, brightness of light in a case when the air gap A is present between the color conversion layer 350 and the prism sheet 372 differs from that in a case when the air gap A is not present therebetween.

Referring to FIG. 14A, it may be seen that when the air gap A is present between the color conversion layer 350 and the prism sheet 372, less light, which is incident on the prism sheet 372 at an angle of 90 degrees and totally reflected, is emitted and most light is emitted toward the display panel.

On the other hand, referring to FIG. 14B, it may be seen that when the air gap A is not present between the color conversion layer 350 and the prism sheet 372, more light, which is incident on the prism sheet 372 at an angle of 90 degrees and totally reflected, is emitted and most light fails to be emitted toward the display panel and is incident again on the color conversion layer 350.

As a result, according to the embodiment of the present disclosure, as the air gap A is formed between the color conversion layer 350 and the prism sheet 372, in comparison to a configuration in which the color conversion layer 350 and the prism sheet 372 are simply attached to each other without the air gap A therebetween, light increases such that brightness may be improved as shown in FIG. 15.

Eighth Embodiment

Figure 16:
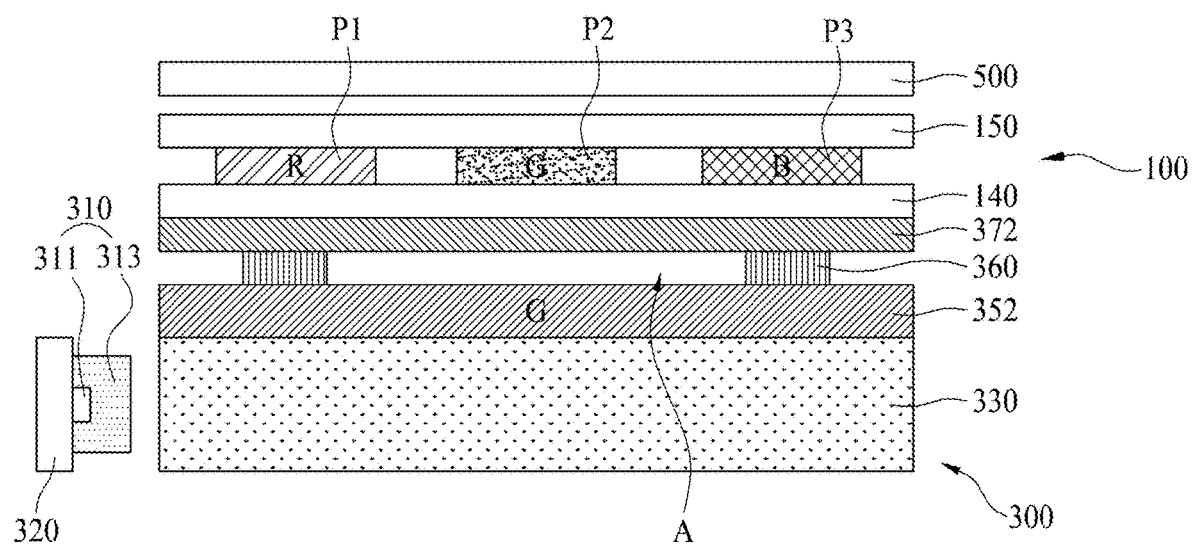
FIG. 16 is a schematic cross-sectional view illustrating an eighth embodiment of the color conversion layer and the adhesive layer.

FIG. 16 is a schematic cross-sectional view illustrating an eighth embodiment of the color conversion layer and the adhesive layer.

Referring to FIG. 16, a liquid crystal display device includes the display panel 100 and the backlight unit 300.

Here, the display panel 100 may be a liquid crystal panel. The liquid crystal panel does not have its own light emitting element and needs an additional light source.

Accordingly, the backlight unit 300 which includes a light source on a rear surface is provided and emits light toward a front surface of the display panel 100 formed of an LCD such that a recognizable image is embodied therethrough.

Although not shown in the drawing, in detail, the display panel 100 formed of an LCD includes the upper and lower substrates 110 and 120 (refer to FIG. 4) and a liquid crystal layer (not shown) interposed between the two substrates 110 and 120. The backlight unit 300 is provided therebehind.

Here, the lower substrate 110 includes a plurality of gate lines which are formed on an inside of the lower substrate 110 to be spaced at certain intervals apart in parallel and data lines which intersect with the gate lines to form pixel areas. A TFT is formed at each of intersections of pixels P1, P2, and P3 where the gate lines and the data line intersect each other. In each pixel area, a plurality of pixel electrodes are connected to the TFT through drain contact holes and include a transparent conductive material.

The TFT includes a gate electrode, a gate insulator film, a semiconductor layer, and source and drain electrodes.

Here, the pixel electrode includes a plurality of bars separated and spaced apart in each of the pixels P1, P2, and P3. Also, a common line is formed to be flush with the gate line, and a plurality of common electrodes, which are electrically connected to the common line and alternately spaced apart from the plurality of pixel electrodes separated in the pixels P1, P2, and P3, are formed.

Here, as another example, the pixel electrode may have a plate shape and be formed for each of the pixels P1, P2, and P3. Here, a part of the pixel electrode may be configured to overlap the gate line so as to form a storage capacitor.

Also, when the plurality of pixel electrodes and the common electrodes are formed to be spaced apart in each of the pixels P1, P2, and P3, the lower substrate 110, which operates in an IPS mode, is formed. When only the pixel electrode having a plate shape without the common electrode is formed on the lower substrate 110, the lower substrate 110 which operates in any one of a TN mode, an ECB mode, and a VA mode is formed.

Also, the upper substrate 120, which faces the lower substrate 110, includes color filters having colors, for example, R, G and B corresponding to the pixels P1, P2, and P3 and a black matrix which surrounds each of them and hides non-display elements such as the gate line, the data line, the TFT, and the like.

That is, there are included an R pixel P1 which includes a red color filter, a G pixel P2 which includes a green color filter, and a B pixel P3 which includes a blue color filter.

Here, the red color filter includes red color which transmits light having a red wavelength and absorbs light having other wavelengths. Also, the green color filter includes green color which transmits light having a green wavelength and absorbs light having other wavelengths. The blue color filter includes blue color which transmits light having a blue wavelength and absorbs light having other wavelengths.

The upper polarizing plate 150 is attached to the upper substrate 120 of the display panel 100, and the lower polarizing plate 140 is attached to the lower substrate 110. A light transmission axis of the upper polarizing plate 150 intersects with, or crosses a light transmission axis of the lower polarizing plate 140. Also, an alignment film for setting a pretilt angle of liquid crystals may be formed on inner sides of the upper substrate 120 and the lower substrate 110 that are in contact with the liquid crystals.

Also, the backlight unit 300 which supplies light to the display panel 100 is provided such that the backlight unit 300 refracts light of a light source which is emitted from one surface behind the lower substrate 110 toward the light guide plate 330 to allow the light to be incident on the display panel 100.

The backlight unit 300 includes the light sources 310 formed of a plurality of light emitting diodes (hereinafter, referred to as LEDs), the light guide plate 330, the green color conversion layer 352, the adhesive layer 360, and the prism sheet 372.

Here, the plurality of LEDs 310 are mounted on an LED PCB 320 and form an LED assembly. The LED assembly is fixed using a method such as adhesion and the like such that light, which is emitted from each of the plurality of LEDs 310, faces an incident surface of the light guide plate 330.

Accordingly, light emitted from each of the LEDs 310 is incident on the incident surface of the light guide plate 330, refracted therein toward the display panel 100, treated as a high-quality surface light source while passing through the green color conversion layer 352 and the prism sheet 372 with the light reflected by the reflection sheet 340, and supplied to the display panel 100.

Here, each of the plurality of LEDs 310 is formed as a magenta LED which includes a blue LED chip 311, which emits blue light, and a red fluorescent body 313, which is applied to a top of the blue LED chip 311.

That is, blue light emitted by the blue LED chip 311 is mixed with red light emitted by the red fluorescent body 313 such that magenta light exits outward.

The light guide plate 330 converts light emitted from the light sources 310 into a surface light source and emits the light toward the display panel 100.

In the eighth embodiment of the present disclosure, the magenta light, in which blue light and red light are mixed, is incident on the light guide plate 330. Accordingly, the light guide plate 330 allows the magenta light to proceed toward the display panel 100.

The green color conversion layer 352 is formed on the light guide plate 330 to overlap a plurality of pixels P1, P2, and P3. The green color conversion layer 352 is disposed on a path of light which proceeds toward the display panel 100 from the light guide plate 330 and converts the magenta light emitted by the light guide plate 330 into white light.

In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and light which has passed through the green color conversion layer 352 is mixed with blue light, red light, and green light and converted into white.

The above-described green light emitting material includes a green phosphorescent material or a green fluorescent material and is mixed with a transparent resin material, such as a silicone resin, to form the green color conversion layer 352.

The prism sheet 372 located above the green color conversion layer 352 condenses light, which is incident thereon, in a first direction. Here, the first direction may correspond to a major axis direction or a minor axis direction of the light guide plate 330.

The adhesive layer 360 is disposed between the green color conversion layer 352 and the prism sheet 372.

The adhesive layer 360 is formed on only a part of a top surface of the green color conversion layer 352 so as to allow the prism sheet 372 to adhere to the green color conversion layer 352 simultaneously while forming an air gap A between the green color conversion layer 352 and the prism sheet 372.

Here, it is necessary to form the adhesive layer 360 to not overlap the G pixel P2 such that the green light generated by the green color conversion layer 352 proceeds toward the G pixel P2 without luminance reduction. That is, the adhesive layer 360 is formed to overlap the R pixel P1 and the B pixel P3.

Accordingly, in the liquid crystal display device according to the eighth embodiment of the present disclosure, in the R pixel P1, as the white light generated by the green color conversion layer 352 passes through the red color filter, blue light and green light are absorbed and only red light is emitted.

Also, in the G pixel P2, as the white light generated by the green color conversion layer 352 passes through the green color filter, the blue light and red light are absorbed and only the green light is emitted. In the B pixel P3, as the white light generated by the green color conversion layer 352 passes through the blue color filter, red light and green light are absorbed and only blue light is emitted.

In the liquid crystal display device according to the eighth embodiment of the present disclosure, only the magenta light is emitted by the light sources 310 and the green light is generated by the green color conversion layer 352. That is, since the red light and the green light are spatially separated and the red light is generated first and then the green light is generated, the liquid crystal display device prevents a red light emitting material from absorbing the green light.

Accordingly, in the liquid crystal display device according to the eighth embodiment of the present disclosure, the green light increases and a half width of a green peak increases, as shown in FIG. 12, such that brightness of light may be expected to increase.

Further, the liquid crystal display device according to the eighth embodiment of the present disclosure may also prevent a light-condensing function of the prism sheet 372 from being deteriorated by a scattering property caused by the green light emitting material of the green color conversion layer 352 by forming the air gap A between the green color conversion layer 352 and the prism sheet 372.

That is, brightness of light in a case when the air gap A is present between the green color conversion layer 352 and the prism sheet 372 differs from that in a case when the air gap A is not present therebetween. When the air gap A is present between the green color conversion layer 352 and the prism sheet 372, less light, which is incident on the prism sheet 372 at an angle of 90 degrees and totally reflected, is emitted and most light is emitted toward the display panel.

On the other hand, when the air gap A is not present between the green color conversion layer 352 and the prism sheet 372, more light, which is incident on the prism sheet 372 at an angle of 90 degrees and totally reflected, is emitted and most light fails to be emitted toward the display panel and is incident again on the green color conversion layer 352.

In other words, it may be seen that when the air gap A is formed between the green color conversion layer 352 and the prism sheet 372, in comparison to a configuration in which the green color conversion layer 352 and the prism sheet 372 are simply attached to each other without the air gap A therebetween, a quantity of light increases such that brightness may be improved.

Meanwhile, the liquid crystal display device according to the eighth embodiment of the present disclosure may further include a light absorption filter 500 above the display panel 100, and more precisely, outside the upper polarizing plate 150.

The light absorption filter 500 includes a light absorption dye (not shown) having a main absorption wavelength band of 495 to 580 nm in a transparent resin (not shown).

Here, the transparent resin may include a binder resin, for example, one or more selected from the group consisting of a polyester binder resin, an acrylic binder resin, a polyurethane binder resin, a melamine binder resin, a polyvinyl alcohol binder resin, an oxazoline binder resin and may preferably include an acrylic binder resin.

Also, the light absorption dye may include: a pyrrole methane (PM) absorption dye, a rhodamine (RH) absorption dye, a boron-dipyrromethane (BDP) absorption dye, a tetra aza porphyrin (TAP) absorption dye, rhodamine, squaraine (SQ), and a cyanine (CY) absorption dye; may preferably include two or more selected from the group consisting of a hydroxy benzotriazole absorption dye, a PM absorption dye, an RH absorption dye, a CY absorption dye, and a TAP absorption dye; and may more preferably include a combination of a hydroxy benzotriazole absorption dye, a CY absorption dye, and a TAP absorption dye.

Through this, the liquid crystal display device according to the eighth embodiment of the present disclosure may also increase a color reproduction range without a loss of light so as to satisfy 90% of recommendation BT.2020.

Here, BT.2020 indicates standards for a color reproduction range of a next-generation display device and has a noticeably increased color reproduction range in comparison to a national television standards committee (NTSC) system, Adobe, a digital cinema initiatives (DCI) specification, and standard red, green, blue (sRGB) color space which exist already.

Since the backlight unit 300 includes the LEDs 310 which emit magenta light and the green color conversion layer 352, the air gap A is formed between the green color conversion layer 352 and the prism sheet 372, and particularly since the light absorption filter 500 having an absorption wavelength band of 495 to 580 nm is located outside the display panel 100, the liquid crystal display device according to the eighth embodiment of the present disclosure may increase luminance as well as color reproduction so as to satisfy 90% or more BT.2020.

Figure 17:
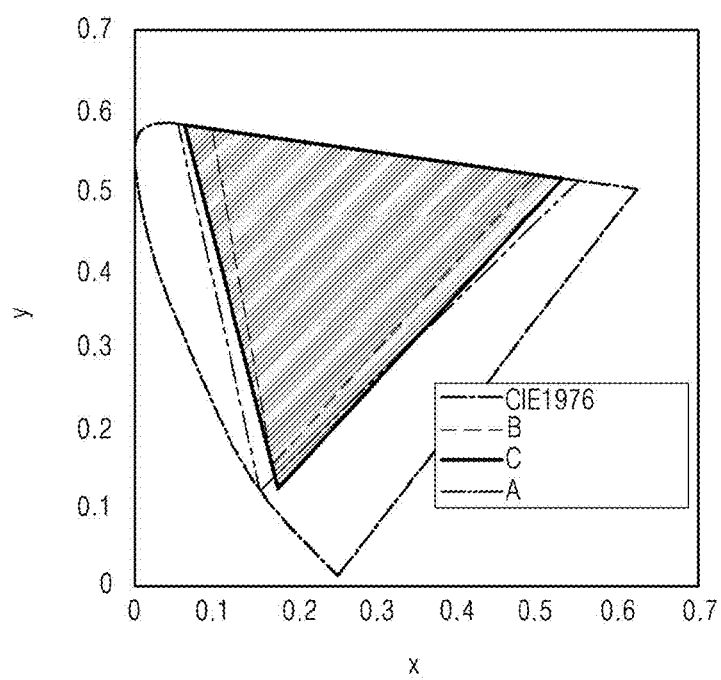
FIG. 17 is a view illustrating comparison of a color reproduction range of BT.2020 and a color reproduction range of a liquid crystal display device according to the eighth embodiment of the present disclosure on a color coordinate system CIE1976.

FIG. 17 is a view illustrating comparison of a color reproduction range of BT.2020 and a color reproduction range of the liquid crystal display device according to the eighth embodiment of the present disclosure on a color coordinate system CIE1976.

Before a description of improvement effects of experimental results with a color reproduction range (CRR), a color gamut and a CRR will be defined.

The color gamut refers to illustrating of physical properties related to color expression of an apparatus which obtains, processes, and outputs an image as a figure (generally a triangle) shown on a color coordinate system. As representative color gamuts, there are presently NTSC, BT.709, sRGB, Adobe RGB, DCI, BT2020, and the like.

In the present disclosure, a description will be given on the basis of BT.2020 which is a set of standards for 4K/UHD recommended by international telecommunication union (ITU) which is an international broadcasting standard group.

Also, a CRR refers to a value shown as a rate (%) of a relative area in a reference color gamut instead of referring to a color gamut as an absolute area. In the present disclosure, a CRR is calculated on the basis of the color gamut of BT2020 and is shown as an overlap rate (%) of a relative area to a reference color gamut instead of a rate (%) thereof.

Referring to FIG. 17 for a graph therein and following Table 1, an area of a CRR of BT2020 (standard color coordinates) in a color space CIE1976 is referred to as A, an area of a CRR of the liquid crystal display device according to the first embodiment of the present disclosure (Sample 1) is referred to as B, and an area of a CRR of the liquid crystal display device according to the eighth embodiment of the present disclosure is referred to as C.

Here, when the CRR areas A, B, and C are compared with one another, it may be seen that Sample 2 has an area similar to the CRR A of BT.2020 in comparison to Sample 1.

In other words, it means that the liquid crystal display device according to the eighth embodiment of the present disclosure satisfies the CRR of BT.2020 more than the liquid crystal display device according to the first embodiment of the present disclosure.

TABLE 1

|  | Sample 1 | Sample 2 | Sample 3 |
|---|---|---|---|
| Color Gamut/Overlap Rate (%) of BT.2020 | 72% | 90 to 91% | 70% |
| Luminance Efficiency (%) | 64% | 80% | 89% |

In Table 1, it may be seen that Sample 2 decreases in luminance efficiency, but less than 10% in comparison to Sample 3, which is a liquid crystal display device including only a light absorption filter and noticeably increases more than Sample 1.

Also, it may be more clearly seen that Samples 1 and 3 only satisfy 70% of an overlap rate of BT.2020 but Sample 2 satisfies 90% or more of the overlap rate of BT.2020.

As described above, in the liquid crystal display device according to the eighth embodiment of the present disclosure, since the backlight unit 300 includes the LEDs 310 which emit magenta light and the green color conversion layer 352, green light and red light are spatially separated such that the green light and a half width of a green peak increase, and luminance of light also increases. Also, since the air gap A is formed between the green color conversion layer 352 and the prism sheet 372, due to a scattering property caused by a green light emitting material of the green color conversion layer 352, a light-condensing function of the prism sheet 372 may also be prevented from being deteriorated so as to increase the luminance.

Particularly, in the liquid crystal display device according to the eighth embodiment of the present disclosure, the light absorption filter 500 having a main absorption wavelength band of 495 to 580 nm is located above the display panel 100 to increase a CRR without a loss of light such that BT.2020 which is the set of standards for 4K/UHD recommended by ITU, which is an international broadcasting standard group, may also be satisfied 90% or more.

Meanwhile, in the liquid crystal display device according to the eighth embodiment of the present disclosure, the LEDs 310 which are light sources of the backlight unit 300 may include the blue LED chips 311 having a main emission wavelength of 455 to 459 nm.

TABLE 2

| Emission Wavelength (nm) of Blue LED Chip | Color Gamut/Overlap Rate (%) of BT.2020 |
|---|---|
| 455 | 90.5 |
| 456 | 90.5 |
| 457 | 90.5 |
| 458 | 90.3 |
| 459 | 90.0 |
| 460 | 90.4 |

Table 2 illustrates a simulation result of measuring overlap rates of BT.2020 with different main emission wavelengths of the blue LED chips 311 of the LEDs 310 of the liquid crystal display device according to the eighth embodiment of the present disclosure.

Generally, as a main emission wavelength of an LED chip increases, its own light exit efficiency of an LED also increases. As an example, when it is assumed that the light exit efficiency of the LED itself is 100% when the main emission wavelength of the blue LED chip of the LED is 445 nm, the light exit efficiency of the LED itself increases to 140% when the main emission wavelength of the blue LED chip is 460 nm.

However, in the liquid crystal display device according to the eighth embodiment of the present disclosure, it may be seen that the overlap rate of BT.2020 is reduced when the main emission wavelength of the blue LED chip 311 becomes 460 nm or more.

That is, although the light exit efficiency of the LED 310 itself may be increased by increasing the main emission wavelength of he blue LED chip 311 of the LED 310, since the overlap rate of BT.2020 decreases when the main emission wavelength of the blue LED chip 311 is 460 nm or more, the LED 310 which is the light source of the backlight unit 300 includes the blue LED chip 311 having a main emission wavelength of 455 to 459 nm in the liquid crystal display device according to the eighth embodiment of the present disclosure.

As described above, in the liquid crystal display device according to the eighth embodiment of the present disclosure, since the backlight unit 300 includes the LEDs 310 which emit magenta light and the green color conversion layer 352, green light and red light are spatially separated such that the green light and a half width of a green peak increase and luminance of light also increases. Also, since the air gap A is formed between the green color conversion layer 352 and the prism sheet 372, due to a scattering property caused by a green light emitting material of the green color conversion layer 352, a light-condensing function of the prism sheet 372 may also be prevented from being degraded so as to increase the luminance.

Particularly, in the liquid crystal display device according to the eighth embodiment of the present disclosure, the light absorption filter 500 having a main absorption wavelength band of 495 to 580 nm is located above the display panel 100 to increase a CRR without a loss of light such that BT.2020 which is the set of standards for 4K/UHD recommended by ITU, which is an international broadcasting standard group, may also be satisfied 90% or more.

Ninth Embodiment

Figure 18:
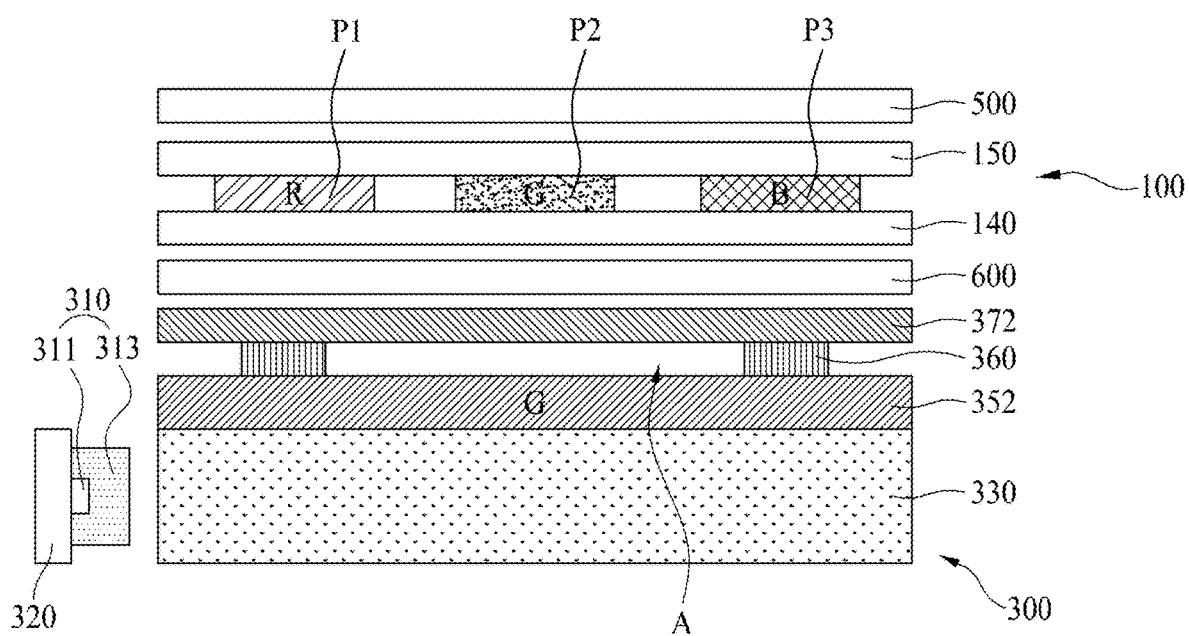
FIG. 18 is a schematic cross-sectional view illustrating a ninth embodiment of the color conversion layer and the adhesive layer.

FIG. 18 is a schematic cross-sectional view illustrating a ninth embodiment of the color conversion layer and the adhesive layer.

In FIG. 18, the liquid crystal display device shown in FIG. 16 may further include a reflective polarizing film 600. The reflective polarizing film 600 is disposed on the prism sheet 372 and regenerates light which is incident thereon such that luminance of light is further improved. The reflective polarizing film 600 is positioned between the prism sheet (optical sheet 370) and the display panel 100.

Since other components are equal to those of FIG. 16, a description thereof will be omitted.

Here, the reflective polarizing film 600 will be described in detail. The reflective polarizing film 600 may be formed by embedding a polarizer having a certain polarizing axis in a stacked structure of dielectric thin films having different refraction rates, or may include a wire grid polarizer or the like formed by arranging micro linear metal patterns of aluminum (Al), silver (Ag), chrome (Cr), and the like which have high reflection efficiency on a base film.

Light efficiency is increased by the reflective polarizing film 600 having the above configuration. The reflective polarizing film 600 transmits a part of light which is incident and reflects other parts thereof. The reflected light is regenerated as a scattered light. A part of the regenerated scattered light is transmitted again by the reflective polarizing film 600 and other parts thereof are reflected again.

Accordingly, since regeneration of light is continuously repeated, light efficiency is increased.

In more detail, a first polarized light of light emitted by the LED 310, which is a light source, is transmitted by the reflective polarizing film 600 and provided to the display panel 100, but a second polarized light perpendicular to the first polarized light is reflected by the reflective polarizing film 600 and regenerated as a scattered light.

A first polarized light of the light, which is regenerated as the scattered light, is transmitted again by the reflective polarizing film 600 and a second polarized light thereof is regenerated again as a scattered light such that light efficiency is increased.

Here, the reflective polarizing film 600 has the same polarizing axis as that of the lower polarizing plate 140 attached to a bottom of the display panel 100 such that the first polarized light transmitted by the reflective polarizing film 600 is transmitted as it is by the lower polarizing plate 140 located below the display panel 100 while being incident on the display panel 100.

Accordingly, since there is no loss of light caused by the lower polarizing plate 140 among light which is transmitted by the reflective polarizing film 600, high luminance may be embodied.

Figure 19:
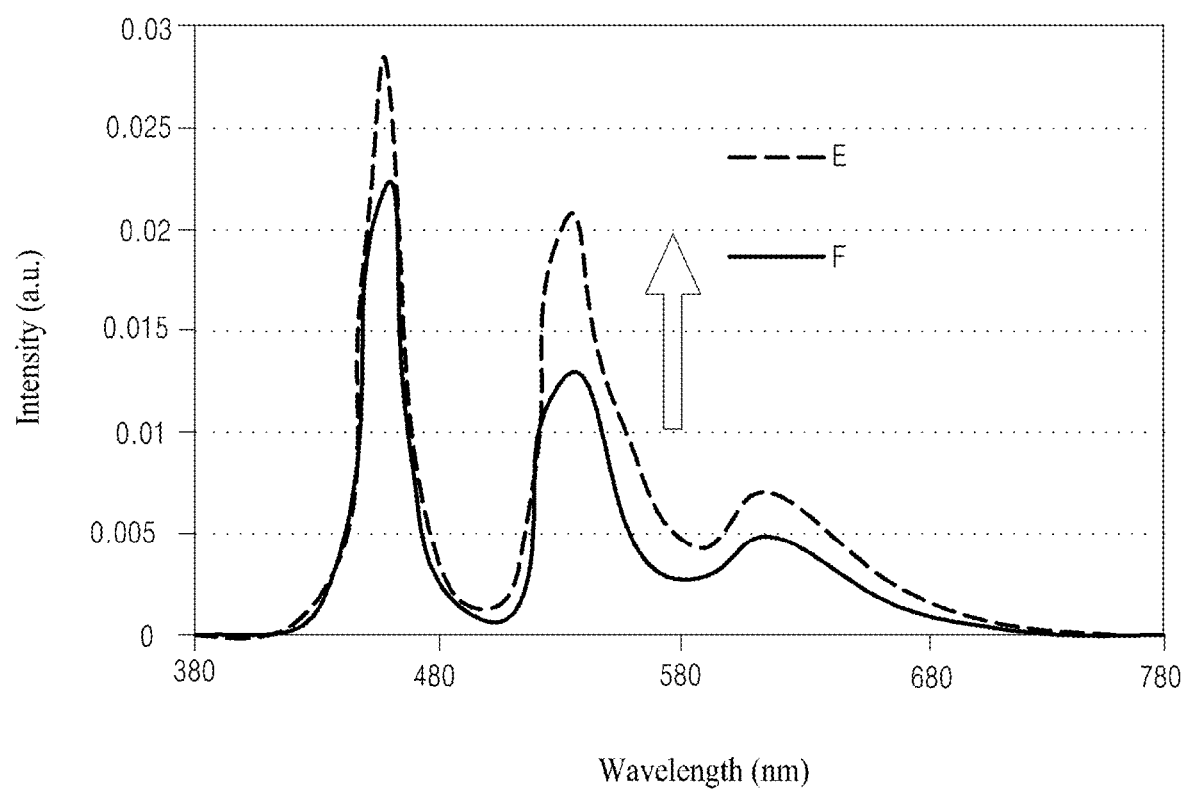
FIG. 19 is a graph illustrating an increase in luminance of a liquid crystal display device according to the ninth embodiment of the present disclosure.

FIG. 19 is a graph illustrating an increase in luminance of the liquid crystal display device according to the ninth embodiment of the present disclosure.

Before describing FIG. 19, it should be noted that E refers to the liquid crystal display device according to the eighth embodiment of the present disclosure and F refers to the liquid crystal display device according to the ninth embodiment of the present disclosure.

Referring to FIG. 19, it may be seen that F has increased luminance more than that of E.

In other words, it indicates that in comparison to the liquid crystal display device according to the eighth embodiment of the present disclosure, which does not include the reflective polarizing film 600, the liquid crystal display device according to the ninth embodiment of the present disclosure has further increased luminance. Through this, it may be seen that the reflective polarizing film 600 increases luminance of the liquid crystal display device.

As described above, according to the embodiments of the present disclosure, since a green color conversion layer which converts blue light into green light is additionally included, red color and green color may be spatially separated such that it is possible to prevent a red light emitting material from absorbing the green light as much as an area in which a green light emitting area overlaps a red color absorption area. As a result, according to the embodiments, the green light increases such that luminance and color reproduction may be improved.

According to the embodiments, an air gap is formed between a color conversion layer and a prism sheet such that light which is perpendicularly incident on the prism sheet may be reduced. Accordingly, light which is incident on the prism sheet may be prevented from being totally reflected, and luminance may be increased by emitting most light toward a display panel.

According to the embodiments, since an adhesive layer is formed to not overlap a green pixel, the green light may be incident on the display panel without a loss such that light efficiency may be increased.

Although the embodiments of the present disclosure have been described above in more detail with reference to the attached drawings, the present disclosure is not limited to the above embodiments and a variety of modifications thereof may be made without departing from the technical concept of the present disclosure.

Accordingly, the embodiments disclosed herein are not intended to limit but explain the technical concept of the present disclosure, and the scope of the present disclosure should not be limited by the above embodiments.

Therefore, the above-described embodiments should be understood to be exemplary and not limiting in every aspect.

It will be apparent to those skilled in the art that various modifications and variations can be made in the backlight unit and the liquid crystal display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A liquid crystal display device, comprising:
   a display panel including a red pixel, a green pixel, and a blue pixel; and
   a backlight unit which emits light to the display panel, wherein the backlight unit includes:
      a light source providing a first color light;
      a color conversion layer disposed on the light source and converting a part of the first color light into a second color light;
      an optical sheet between the display panel and the color conversion layer;
      an air gap between the color conversion layer and the optical sheet; and
      an adhesive layer between the color conversion layer and the optical sheet to overlap a pixel having a same color as the first color light but not to overlap a pixel having a same color as the second color light.

2. The liquid crystal display device of claim 1, wherein the first color light includes blue light, and the second color light includes green light and red light.

3. The liquid crystal display device of claim 2, wherein the color conversion layer includes a red light emitting material converting the blue light into red light, and a green light emitting material converting the blue light into the green light.

4. The liquid crystal display device of claim 2, wherein the color conversion layer includes a red color conversion layer overlapping the red pixel and including a red light emitting material and a green color conversion layer overlapping the green pixel and including a green light emitting material, and wherein the red light emitting material converts the blue light into red light, and the green light emitting material converts the blue light into the green light.

5. The liquid crystal display device of claim 1, wherein the first color light includes blue light and red light, and the second color light includes green light, and wherein the color conversion layer includes a green color conversion material converting a part of the blue light into the green light.

6. The liquid crystal display device of claim 5, wherein the green color conversion layer is disposed to overlap the green pixel.

7. The liquid crystal display device of claim 5, further comprising:
   a light absorption filter having a main absorption wavelength band of 495 to 580 nm and located outside the display panel to be opposite to the backlight unit.

8. The liquid crystal display device of claim 7, wherein the light absorption filter includes a light absorption dye in a transparent resin, and wherein the light absorption dye includes at least one of a pyrrole methane (PM) absorption dye, a rhodamine (RH) absorption dye, a boron-dipyrromethane (BDP) absorption dye, a tetra aza porphyrin (TAP) absorption dye, rhodamine, squaraine (SQ), and a cyanine (CY) absorption dye.

9. The liquid crystal display device of claim 7, wherein the light source includes a blue light emitting diode (LED) chip and a red fluorescent body, and wherein a main emission wavelength of the blue LED chip is 455 to 459 nm.

10. The liquid crystal display device of claim 7, further comprising a reflective polarizing film located between the optical sheet and the display panel.

11. The liquid crystal display device of claim 10, further comprising:
   an upper polarizing plate located on an upper side of the display panel, and a lower polarizing plate between a lower side of the display panel and the reflective polarizing film,
   wherein a polarizing axis of the reflective polarizing film is the same as that of the lower polarizing plate.

12. The liquid crystal display device of claim 1, wherein the first color light includes blue light, and the second color light includes yellow light, and wherein the color conversion layer includes a yellow color conversion material converting a part of the blue light into the yellow light.

13. The liquid crystal display device of claim 1, wherein the adhesive layer overlaps at least one of the red pixel and the blue pixel.

14. A backlight unit for a liquid crystal display including color pixels, comprising:
   a light source providing a first color light;
   an optical sheet on the light source;
   a color conversion layer between the light source and the optical sheet and converting a part of the first color light into a second color light;
   an air gap between the color conversion layer and the optical sheet,
   wherein the first color light includes blue light, and the second color light includes green light; and
   an adhesive layer between the color conversion layer and the optical sheet to overlap a pixel having a same color as the first color light but not to overlap a pixel having a same color as the second color light.

15. The backlight unit of claim 14, wherein the color conversion layer includes a red light emitting material converting the blue light into red light, and a green light emitting material converting the blue light into the green light.

16. The backlight unit of claim 14, wherein the color conversion layer includes:
   a red color conversion layer converting a part of the blue light into red light; and
   a green color conversion layer converting another part of the blue light into the green light.

17. The backlight unit of claim 14, wherein the first color light further includes red light, and wherein the color conversion layer includes a green color conversion material converting a part of the blue light into the green light.

18. The backlight unit of claim 14, wherein the adhesive layer has an area smaller than the color conversion layer.

* * * * *